H. M. SIEMANN.
PLANT BLOCKING OR SPACING MACHINE.
APPLICATION FILED APR. 7, 1915.
1,211,971.                                    Patented Jan. 9, 1917.
2 SHEETS—SHEET 1.
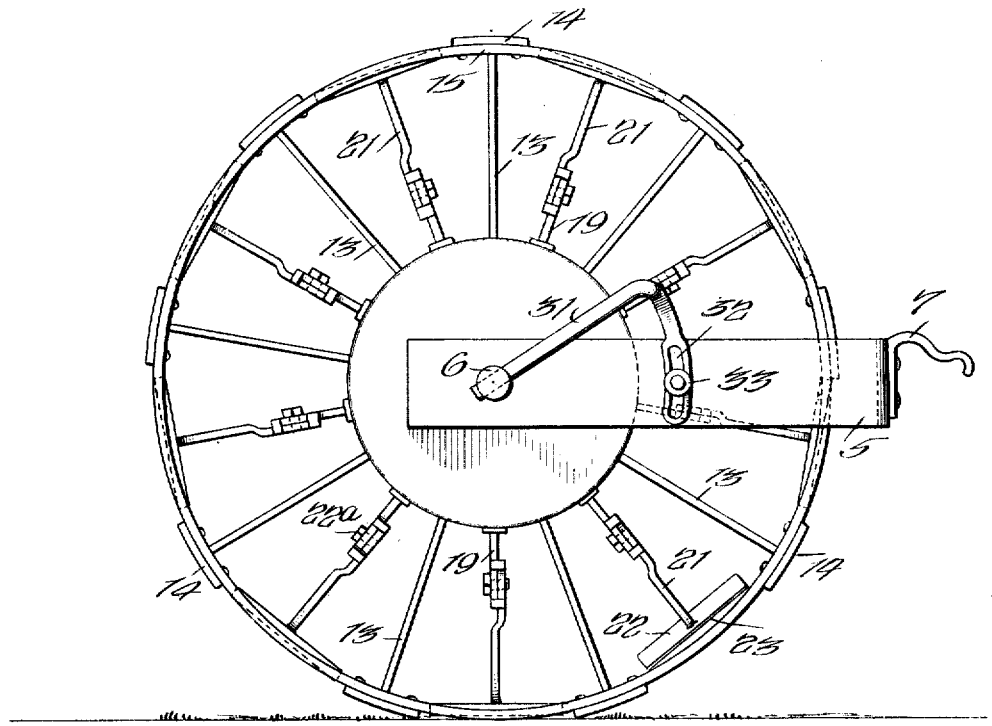
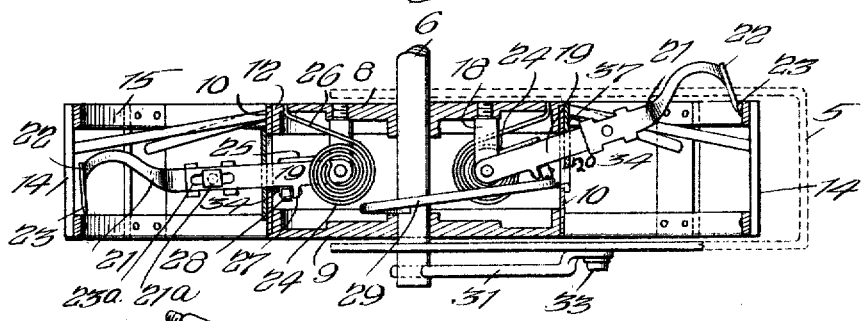
WITNESSES:
INVENTOR
HENRY M. SIEMANN,
BY Munn & Co.
ATTORNEYS H. M. SIEMANN.
PLANT BLOCKING OR SPACING MACHINE.
APPLICATION FILED APR. 7, 1915.
1,211,971.
Patented Jan. 9, 1917.
2 SHEETS—SHEET 2.
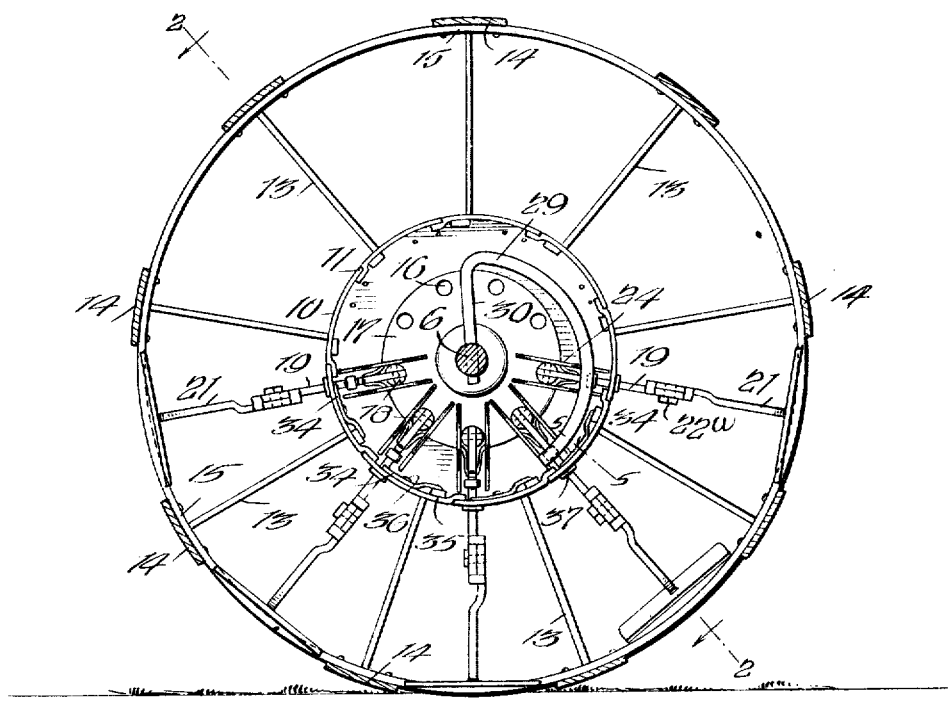
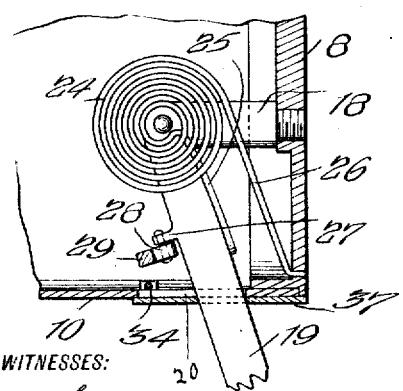
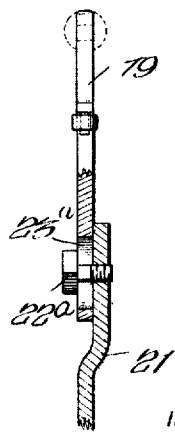
WITNESSES:
INVENTOR
HENRY M. SIEMANN,
BY Munn & Co.
ATTORNEYS

UNITED STATES PATENT OFFICE.

HENRY MORTIMER SIEMANN, OF FORT LUPTON, COLORADO.

PLANT BLOCKING OR SPACING MACHINE.

1,211,971.      Specification of Letters Patent.      Patented Jan. 9, 1917.

Application filed April 7, 1915. Serial No. 19,690.

*To all whom it may concern:*

Be it known that I, HENRY M. SIEMANN, a citizen of the United States, and a resident of Fort Lupton, in the county of Weld and State of Colorado, have invented certain new and useful Improvements in Plant Blocking or Spacing Machines, of which the following is a full description.

This invention relates to an improvement in plant blocking or spacing machines, and one of the principal objects of the invention is to provide such a machine having a plurality of radially arranged arms associated with a wheel and provided with cutting or chopping means, and adapted as the wheel rolls along the row of plants to be successively operated for cutting or chopping the plants at spaced intervals, whereby to properly block the row.

Another object of the invention is to provide a device of the class described in the nature of a wheel adapted to follow the rows of plants and having a plurality of radially extending arms adapted to be actuated through the medium of a cam element, and suitable springs for moving the cutting elements carried by the arms successively into cutting positions, whereby to chop the plants at spaced intervals.

A still further object is to provide a device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a view in side elevation of a machine constructed according to my invention. Fig. 2 represents a view in section taken diametrically thereof on the plane indicated by the line 2—2 of Fig. 4, looking in the direction indicated by the arrows. Fig. 3 represents a view in perspective of one of the adjustable arms removed. Fig. 4 represents a view in elevation, partially in section, with the rear plate or side wall of the drum removed, and with a number of the radial arms removed. Fig. 5 represents a view in section taken on the plane indicated by the line 5—5 of Fig. 4. Fig. 6 represents a fragmentary view partially in section of one of the adjustable arms.

In carrying out my invention I provide a substantially U-shaped frame or yoke 5 carrying an axle 6 for rotatably supporting the device, said frame 5 being provided with suitable elements indicated at 7 whereby the apparatus may be attached to a cultivator or like implement.

Rotatably disposed upon axle 6 is a drum consisting of the rear wall or disk 8, a front plate or disk 9, and a circular wall secured to the disks and consisting of the segments 10. The latter are arcuate in formation as indicated in Fig. 4 and their edges overlap each other as at 11. The ends of the segments forming the annular wall of the drum are suitably secured to the inwardly extending flanges 12 provided on the disks 8 and 9. Extending radially from the disk 8 and at equally spaced intervals are the spokes 13. These spokes at their outer ends are secured, each to a cross piece 14, connecting the spaced rims or tires 15, which surround the drum. The cross pieces 14 are secured to the outer surfaces of the tires 15 in any suitable manner.

Into each of a circular series of threaded openings 16 provided in the thickened portion 17 of disk 8, is turned the reduced threaded end of a pin 18. In the outer bifurcated end of each pin 18 is pivoted the inner end of the inner section 19 of one of the extensible arms. This section extends radially outwardly and projects through a slot or elongated opening 20 provided in one of the wall segments 10. To the outer end of each section 19 is adjustably connected an outer arm section 21. The latter carries a set screw 22ª extending through a slot 23ª provided in section 19 as indicated in Fig. 6, whereby the outer section 21 may be adjusted relatively to the inner section 19. Each section 21 is provided at its outer end with a cutting element in the form of a hoe blade 22 having a sharpened inner edge 23. As will be noted, the extensible arms are mounted so as to extend radially with respect to the drum and so as to be capable of oscillation in planes extending at right angles to the direction of movement of the wheel.

Each of the extensible arms is normally maintained at the outer extremity of its movement, and hence in the plane of movement of the wheel, by means of a spring consisting of a pair of coils 24 lying on each side of the point of pivotal connection of the extensible arm and adjacent pin 18, and connected by a tongue 25 which bears upon the inner edge of the arm. The coils 24 terminate in arms 26 connected at their outer ends to the disk 8.

Each section 19 is provided with an outwardly extending lug 27 on which a roller 28 is carried.

Disposed within the drum is a cam element in the form of a curved arm 29 which, at its inner end, is bent at an acute angle as at 30 and is extended through an opening in the axle 6. This arm 29, it will be understood, is maintained in fixed position relatively to the axle. It extends as indicated in Fig. 2, in a plane disposed at an angle to the plane in which the extensible arms lie when in normal position, and it extends circumferentially of the drum within the latter, as indicated in Fig. 4.

Extending through an opening in the axle 6 without the frame 5, is one end of an angular lever 31 whose outer end is flattened and provided with an arcuate slot 32 which runs over a set screw or adjusting bolt 33 carried by frame 5. In this manner, axle 6 together with the cam element 29, is maintained in fixed relation and against rotation. The drum, however, rotates about the axle carrying with it the extensible arms to which the cutting elements are connected.

The operation of the device may be briefly described as follows: As the frame is drawn forwardly the outer rims 15 roll along the ground on opposite sides of the row of plants. The extensible arms in moving with the drums successively come in contact with the inner end of the cam element 29, the rollers 28 carried by those arms engaging with said element, and as the drum rotates the arms are, by reason of their contact with this cam element, shifted against the tension of the coil springs to the inner extremity of their movement as indicated to the right in Fig. 2, thus moving the hoes 22 out of the line of the row of plants. As soon as the arms move off of the cam, they are through action of the coil springs shifted inwardly, so that the sharp edges of the hoes cut transversely across the row of plants. The cam element is so disposed, therefore, that the arms will not be released until such time as they are in approximately vertical position and beneath the drum, so that when the hoe blade makes its cutting movement, said blade will be approximately in a horizontal position. This cam element may be readily shifted and adjusted from one position into another by moving the lever 31, and with it the axle 6 into the desired position.

In order that the arm sections 19 will not strike against the outer ends of the slots 20 with a decided shock, the springs 34 are provided. Each of these at its free end, extends over or bridges one of the slots 20 near the outer end of the latter, in such manner as to be engaged by the arm section 19 before the latter reaches the outward extremity of its movement, thus easing its movement into engagement with the outer end of the slot. The springs 34 as indicated in Fig. 4, are connected at their inner ends to blocks 35 supported by the segments 10, and intermediate their ends are secured to pins or studs indicated at 36 in such manner as to maintain the springs in position.

In order that dirt and dust may be prevented from entering through the openings or slots 20, each of the arm sections 19 is provided exteriorly of the drum with a plate indicated at 37, through which plate the arm section extends. The plate is adapted to reciprocate with the arm section, and may be suitably connected to said section in any desirable manner. The length of the plate 37 is such that whether the arm be at the inner or outer extremities of its path of movement, the plate or a section thereof overlies the slot 20.

By adjusting the length of the hoe carrying arms, the required depth of cut may be obtained. From the foregoing it will be understood that I have provided a spacing or blocking machine which will accurately block out the rows of plants, and which may readily be adjusted to accommodate changes in conditions under which the device is working. The device may be used as a one row hand machine, or by placing a plurality of them behind a cultivator, a number of rows may be blocked out at the same time.

Although I have described the preferred embodiment of my invention, I may desire to make such changes in the construction, combination, and arrangement of parts thereof as do not depart from the spirit of the invention and the scope of the appended claims.

I claim:—

1. A device of the class described, comprising a stationary axle, a drum revoluble on the axle, a rim surrounding the drum and connected thereto, a plurality of arms pivotally mounted at their inner ends within the drum and extending at their outer ends beyond the drum through slots cut in the peripheral wall of the drum, cutting blades carried by the arms, spring means housed within the drums normally maintaining the arms in a common plane with the drums, means housed within the drum and carried by the axle for successively shifting the arms out of normal position and then releasing them, and plates movable with the arms and overlying the slots in the drum wall through which the arms extend.

2. A device of the class described, including a wheel having a drum at its hub, said drum being provided in its peripheral wall with a plurality of slots, chopping arms pivotally mounted at points within the drum and extending through the slots, means housed within the drum for operating the chopping arms, and means for maintaining the slots in closed position against entrance of foreign matter to the drum.

3. A device of the class described including a wheel having a drum portion, a plurality of chopping arms mounted within the drum and extending therefrom through apertures provided in the drum, means within the drum for causing the operation of the arms, and means for preventing entrance of foreign matter to the drum through the apertures.

HENRY MORTIMER SIEMANN.

Witnesses:
FREDRICK SIEMANN,
MATHIAS ERIKSEN.

Copies of this patent may be obtained for five cents each, by addressing the "Commissioner of Patents, Washington, D. C."